June 17, 1930.  H. H. COTTON  1,764,828
BOOK INDEX NOTCHER AND PRINTER
Filed Nov. 10, 1927   7 Sheets-Sheet 1

INVENTOR
Harold H. Cotton
BY
his ATTORNEY

June 17, 1930. H. H. COTTON 1,764,828
BOOK INDEX NOTCHER AND PRINTER
Filed Nov. 10, 1927 7 Sheets-Sheet 3

INVENTOR
Harold H. Cotton
BY
his ATTORNEY

June 17, 1930.  H. H. COTTON  1,764,828
BOOK INDEX NOTCHER AND PRINTER
Filed Nov. 10, 1927  7 Sheets-Sheet 4

INVENTOR
*Harold H. Cotton*
BY
*his* ATTORNEY

June 17, 1930. H. H. COTTON 1,764,828
BOOK INDEX NOTCHER AND PRINTER
Filed Nov. 10, 1927 7 Sheets-Sheet 5

INVENTOR
Harold H. Cotton
BY
his ATTORNEY

June 17, 1930.  H. H. COTTON  1,764,828
BOOK INDEX NOTCHER AND PRINTER
Filed Nov. 10, 1927   7 Sheets-Sheet 7

Fig. 12

INVENTOR
Harold H. Cotton
BY
ATTORNEY

Patented June 17, 1930

1,764,828

UNITED STATES PATENT OFFICE

HAROLD H. COTTON, OF ROCHESTER, NEW YORK

BOOK-INDEX NOTCHER AND PRINTER

Application filed November 10, 1927. Serial No. 232,293.

The present invention relates to a book index notcher and printer and an object thereof is to provide a machine which will by one operation print an index in a book and notch the leaves above the printed matter to expose the latter. Another object of the invention is to provide with a notcher, a printing mechanism having its printing point in line with the line of movement of the notcher. Another object of the invention is to provide a machine in which the work support and the notcher and/or the printing mechanism are relatively movable for the purpose of permitting the notcher and/or work support to cooperate with different portions of the work on the work support, provision being made whereby the notcher and/or the printing mechanism may move transversely of the first line of movement in order to be carried toward and from the work on the work support after each operation. Still another object of the invention is to yieldingly support the notcher and/or the printing mechanism above the work support so that the notcher and/or the work support may be shifted toward the work on the work support. A further object of the invention is to provide a construction in which a cutting platen is supported on the leaf to be printed on which a notcher operates to notch the leaves above the leaf to be printed and a printing mechanism prints the index character on the leaf, a common operating mechanism being employed for the notcher and the printing mechanism. A still further object is to provide a construction in which a common operating means for the notcher and the printing mechanism effects the shifting of the two parts to another position over the work and also effects the shifting of another character on the printing mechanism to the printing point.

To these and other ends, the invention consists of certain parts and combinations of parts all of which will be hereinafter described; the novel features being pointed out in the appended claims.

In the illustrated embodiment of the invention, 1 indicates the bed plate of a work support which has depending from the underside thereof legs 2. The book 3 is placed on the upper surface of said support and the binding edge of the book is bent or deflected downwardly so that the free edges of the leaves are arranged with each projecting slightly beyond the one next above it and the edges of the whole form an acute angle to the top surface of the bed plate 1.

For holding the book in this position, there may be provided a clamping means embodying preferably a supporting bar 4 provided at the center with a clamping screw 5 having a knurled wheel 6 at its upper end through which it is turned and having its lower end mounted to turn in a clamping bar 7 which bears on the book 3. The supporting bar 4 may have sleeves 8 at its opposite ends guided on posts 9 and held to said post by thumb screws 10. The posts in turn, may be pivoted at 11 to brackets 12 secured to the upper face of the bed 1. This pivotal connection between the two guides 7 and the bed permit the guides to be folded onto the bed plate so that the machine may be readily carried or shipped in a small space.

When a large number of books of the same size are to be indexed, suitable gaging devices may be employed for defining the position of each book and also the amount of the rearward bending of the binding edge of the latter. To this end, two gages 13 are provided on the bed plate for cooperating with the ends of the book. These gages are adjustably mounted and to this end have ribs 14 operating in a longitudinally extending groove 15. Screws 16 are anchored in the bed and pass through slots 17 in the gages, thus effectively holding the gages in their adjusted positions and at the same time permitting the ready adjustment of the gages toward and from each other to accommodate books of different sizes. For gaging the position of the binding edge of the book, a gage 18 may be provided for cooperating with said edge, said gage having a horizontally extending portion and a depending portion. The depending portion may be provided with slots 19 through which clamp screws 20 pass, said screws being anchored in a depending portion 21 on an adjustable member 22 which by clamp screws 23 is secured to the underside of the bed 1, said adjustable member having slots 24 which permit the member 22 to shift the gage 18 forward and backward on the bed plate 1.

Figure 1:
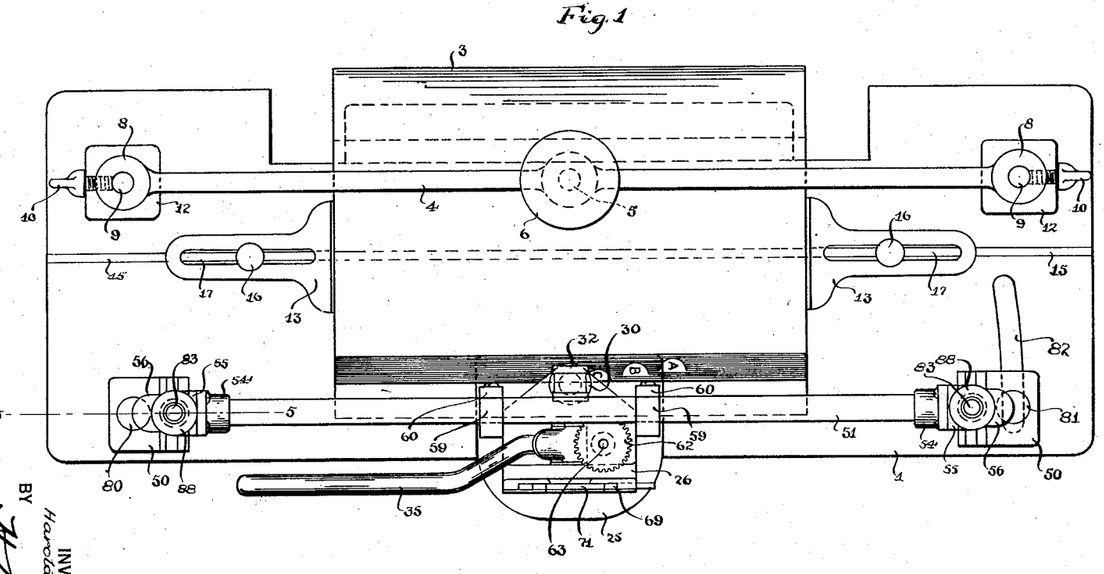
Fig. 1 is a plan view of the machine constructed in accordance with this invention.
Figure 2:
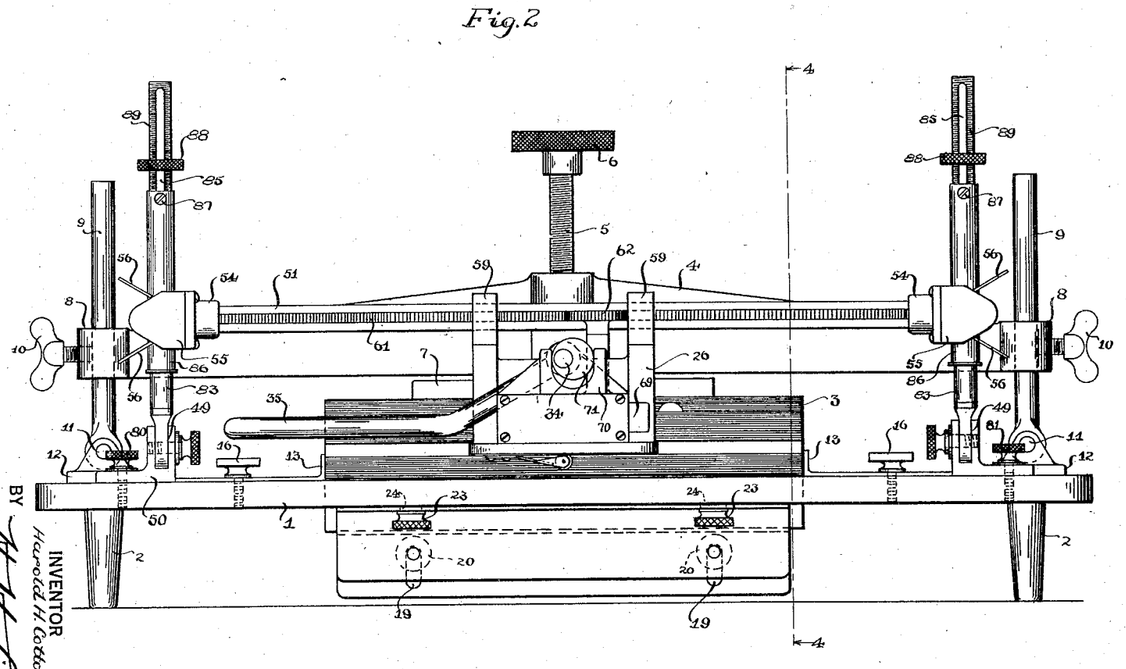
Fig. 2 is a front elevation of the machine.
Figure 3:
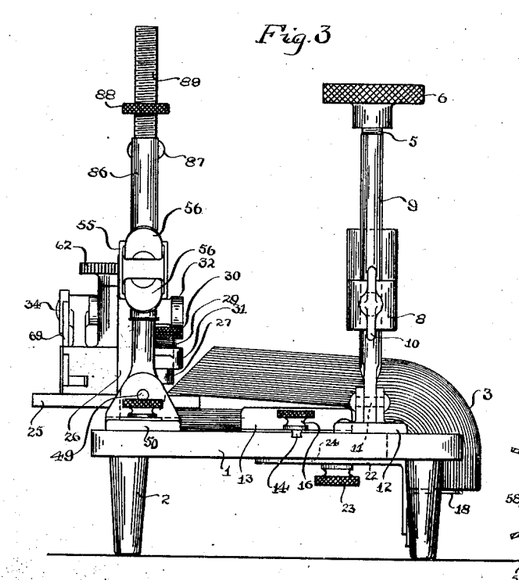
Fig. 3 is an end elevation of the machine.
Figure 4:
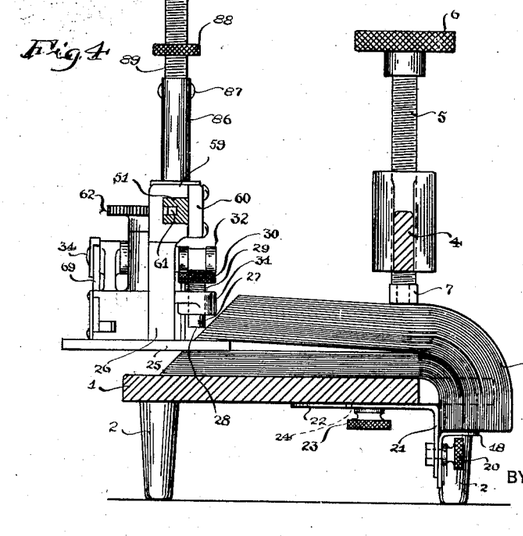
Fig. 4 is a section on the line 4—4, Fig. 2.
Figure 5:
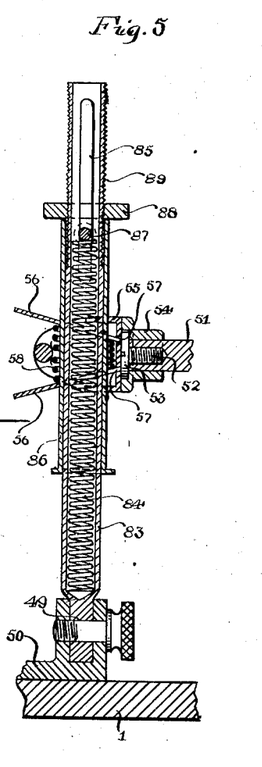
Fig. 5 is a section on the line 5—5, Fig. 1.
Figure 6:
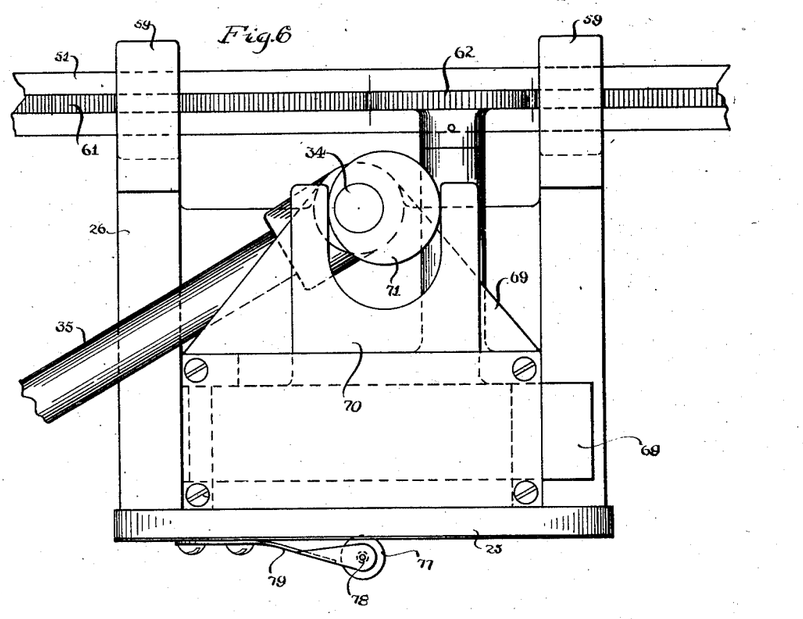
Fig. 6 is a front elevation of the carriage.
Figure 7:
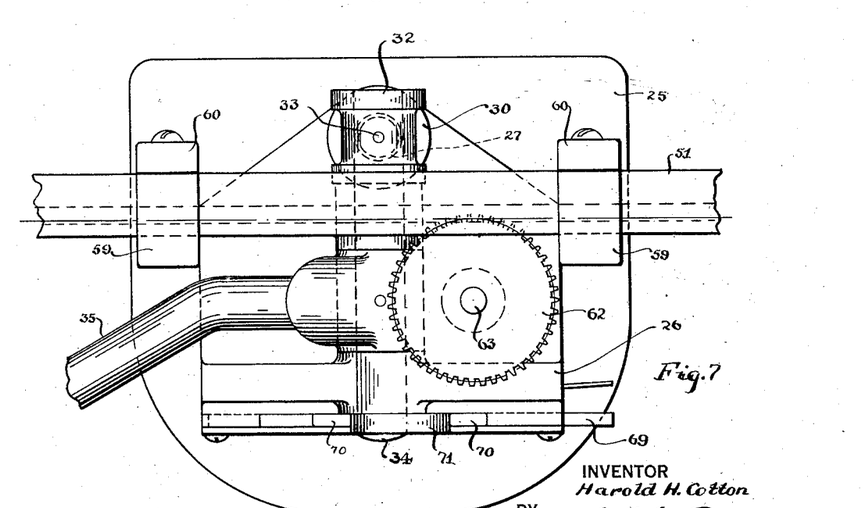
Fig. 7 is a plan view of the carriage.
Figure 8:
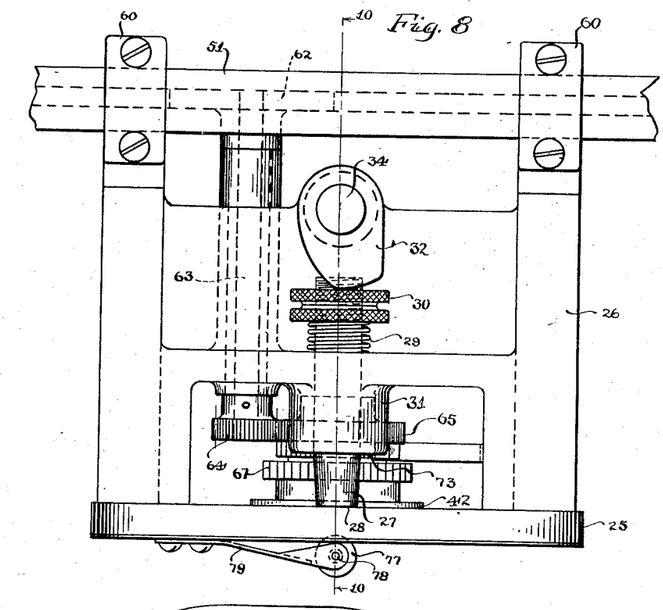
Fig. 8 is a rear view of the carriage.
Figure 9:
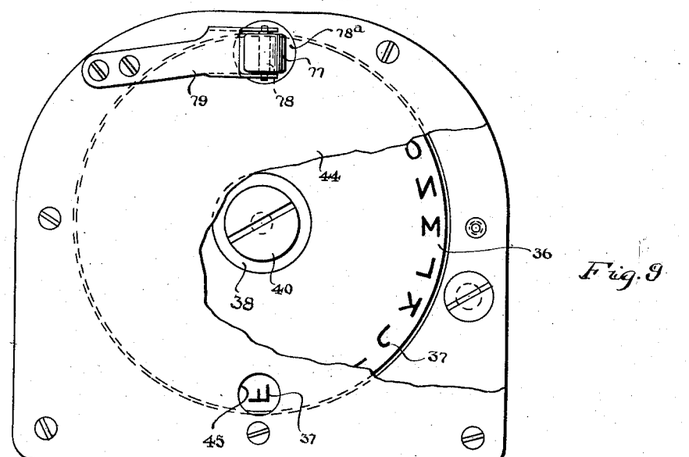
Fig. 9 is a bottom view of the carriage with the bottom plate broken away to illustrate the type wheel or printing member.
Figure 10:
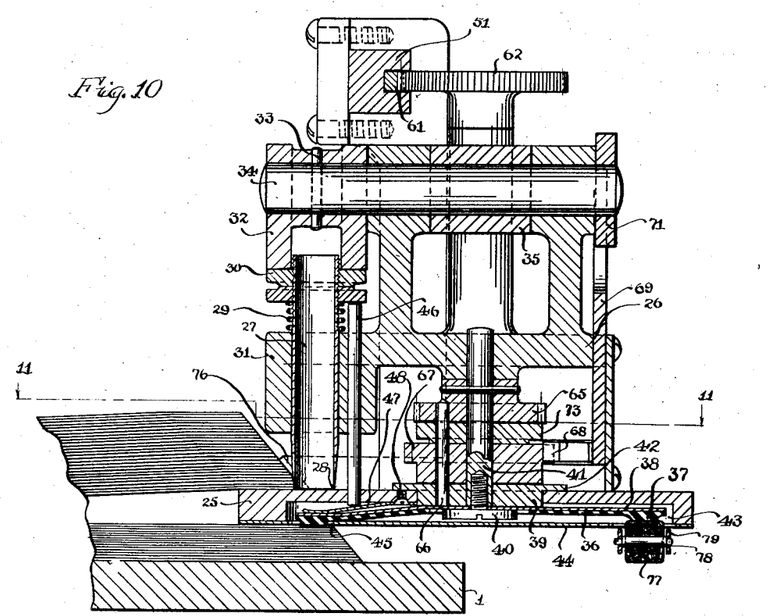
Fig. 10 is a section on the line 10—10, Fig. 8.
Figure 11:
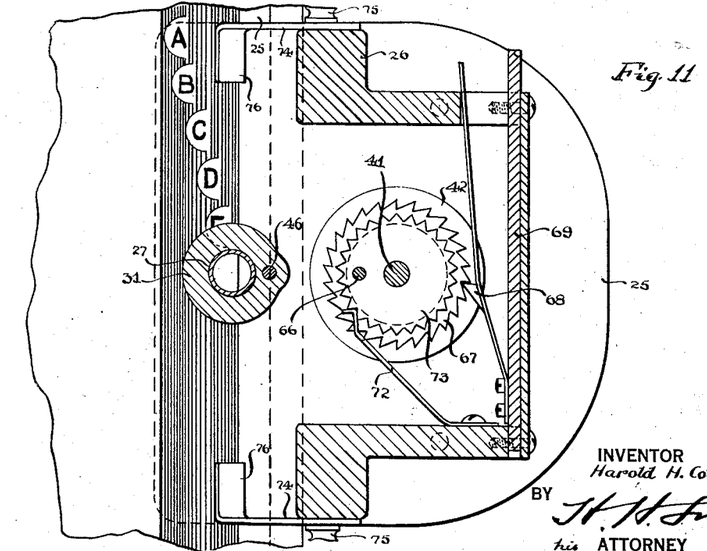
Fig. 11 is a section on the line 11—11, Fig. 10.

For notching the leaves to provide the thumb notches, there may be employed a notching mechanism comprising preferably a cutting platen 25 supported by a carriage 26 which also supports a notcher or cutting tool 27, in this instance, in the form of a tube having its lower edge sharpened to provide a knife edge 28 adapted to cooperate to the cutting platen 25. This notcher 27 is, in this instance, longitudinally movable toward and from the platen 25 and is normally held away from said platen by a helical spring 29 surrounding the notcher 27 below an adjustable nut 30 thereon, the lower end of the spring abutting the guide tube 31 in which the notcher 27 slides. Operation of the notcher toward the platen 25 may be effected by a double cam 32 pinned at 33 to a shaft 34 mounted to turn on the carriage 26. A lever 35 is also secured to this shaft and acts as a means for turning the cam 32 to move the notcher 27 toward the platen 25 against the action of the spring 29. The platen 25 is introduced between the leaves and directly above that leaf which is to have the index printed thereon, the leaves above said index leaf resting on the platen 25 so that when the notcher descends, it cuts a notch in a number of leaves immediately above the leaf on which the index is to be printed, all of which is shown clearly in Fig. 10 of the drawing.

The printing mechanism may be of any suitable construction and comprises, in this instance, a disk 36 formed of a rubber or other flexible material and having on the under face thereof, adjacent its perimeter, an annular series of characters 27, which preferably form the complete alphabet. This disk has secured to its upper face a thin flexible but resilient disk 38 formed of spring steel which tends normally to hold the disk 36 in a flat condition. The disk is mounted to turn about an axis concentric with the annular series of characters 37, and, to this end, it is held against a washer or disk 39 by a head 40 of a screw which passes into one end of a post 41 arranged on the carriage 26. The washer 39 turns in an opening in the platen 25 and on the post 41 and has a projecting flange 42 which overhangs the platen 25. The underside of the platen is recessed to form a chamber 43 in which the printing disk 26 with the resilient disk 38 is arranged. The underside of this chamber is closed by a plate 44 which is provided opposite the notcher 27, or in a line with said notcher, with an opening 45 through which any one of the type characters 37 may be projected in order to print upon that leaf of the book on which the platen 25 rests, this forming the printing point of the printing mechanism, so that the printing point is in line with the line of movement of the notcher and the printing mechanism is separated from the notcher by the cutting platen 25. This arrangement permits the operation of the notcher and the printing mechanism to notch the book and print without any shifting of either the notcher or the printing mechanism.

For effecting the operation of the printing mechanism with the operation of the notcher 27, a novel connection is preferably employed between the notcher and the printing mechanism. In this instance, a plunger 46 is guided in the carriage 26 parallel with the notcher and slightly to one side of the latter with its upper end beneath the adjustable abutment 30 and its lower end passing through the platen 25 to cooperate with a leaf spring 47 which is anchored at 48 to one side of the plunger 46 and has its free end cooperating with the printing member over the printing point. With the depression of the notcher 27, the plunger 46 is depressed and pushes down the leaf spring 47, thereby flexing the printing member and projecting one of the characters 37 through the opening 45 onto the proximate leaf of the book and below the notch cut by the notcher 27.

A novel means is preferably employed for supporting the carriage 26 so that it may move longitudinally of the work support in order to carry the notcher and the printing mechanism from the top to the bottom of the book. With this end in view, the bed 1 supports two upright posts which are pivoted at 49 to brackets 50 on the bed and which are connected by a guide or bar 51, the latter preferably having a rotary motion on the posts about an axis extending longitudinally of the guide. In this instance, the guide has screws 52 in opposite ends thereof provided with enlarged heads 53, the heads and the guides turning in bearing blocks 54 which are carried by guide pieces 55 movable on the posts. These guide pieces 55 also may carry means for establishing clutching relation with the posts. In this instance, each clutching means embodies two levers 56 surrounding a post and pivoted at 57 at their inner ends to a guide piece 55. The outer ends of these clutching levers are held separated by a helical spring 58 which surrounds the post between the two clutching levers and tends to move such clutching levers into clutching relation with the post. By pressing together the clutching levers on both posts, the clutching relation is broken and the guide may be shifted to a desired position on the posts. The guide 51 forms a support for the carriage and, to this end, the carriage 26 has guide portions 59 through which the guide 51 extends and through which it is held by removable blocks 60. This arrangement not only permits the carriage 26 to be moved longitudinally of the work support or from the top to the bottom of the book or vice versa but it permits the carriage to be swung away from the free edges of the leaves in order to be introduced between any two leaves of the book.

A novel means may be employed for advancing the carriage with the notcher and the printing mechanism automatically from the top to the bottom of the book by a step by step movement. With this in view the guide 51 may be provided with a rack bar 61 on one side engaged by a pinion 62 on a shaft 63 which is journalled in the carriage 26. This shaft also carries a pinion 64 at its lower end meshing with a pinion 65 which in turn is through a pin 66 connected with the washer 39. For imparting movement to the gear 62 to cause the latter to travel along the rack bar 61, there is provided a toothed wheel 67 keyed by the pin 66 to the gear 65 and to the washer 39. With this gear 67, a spring pressed pawl 68 cooperates. In this instance, this pawl is mounted on a slide 69 guided on the carriage 26 and moved through the operating lever 35 preferably by providing on the slide 69 a bifurcated portion 70 in which an eccentric 71 on the shaft 34 operates. When the lever 35 is depressed to shift the notcher 27 toward the cutting platen 25, said lever turns the eccentric 71 in order to move it in a direction to cause the pawl 68 to ride over the teeth 67, but upon the return movement of the lever 35, the slide 69 is moved by the eccentric 71 in a direction to cause the pawl 68 to turn the toothed wheel 67 an amount sufficient to present another character 37 to the printing opening 45 and sufficient also to turn the wheel 62 in order to advance the carriage 26 along the guide 51 a distance equal to the distance between the center of two successive notches.

So that the printing member and the character will not shift accidentally and at the same time that each feeding movement will be equal, there may be provided a centering means comprising a spring pressed pawl 72 which cooperates with a toothed wheel 73 also keyed by the pin 66 to turn with a washer 39.

In order to define the depth of a notch there may be employed a gaging means comprising, in this instance, two gage members 74 having arms secured by said screw 75 to opposite sides of the machine, said arms being slotted to permit the gage members to be adjusted toward and from the outer adjacent edge of the cutting plate 25. Each gage member has preferably an inclined wall 76 forming an acute angle with the top face of the cutting platen 25 so that it may conform to the angle of the free edges of the leaves and limit the inward movement of the cutting platen 25. By adjusting the gages 74, the depth of the notch may be varied.

The inking of the printing member 36 may be accomplished by an inking roller 77 journalled on a shaft 78 which is supported by a spring arm 79 over an opening $78^a$ in the plate 44.

It is desirable to change the angle of the guide 51 with reference to the book as the notches when the book is in position to be cut form a line at an acute angle to the edges of the leaves and, with this end in view, one of the brackets 50 is pivoted through a set screw 80 to the bed 1 while the other bracket 50 has its set screw 81 adjustable in an arcuate slot 82 in the bed plate 1. By adjusting the set screw 81 in the slot 82, the guide bar 50 swings about the set screw 80 as an axis and permits the guide to lie at the desired angle to conform to the line of notches.

With the end in view of yieldingly or resiliently supporting the carriage over the bed plate in order to permit the carriage to be lowered quickly after each notch cutting and printing operation or for the next operation any suitable means may be employed. In the embodiment shown in Figs. 1 to 11, this resilient means is provided in the posts which support the guide bar 51 and to this end each post has a main portion 83 formed with a hollow central portion in which a helical spring 84 is arranged. The upper end of this main portion 83 is provided with a vertical guide formed by the walls of the slot 85. Surrounding the main portion 83 is a tubular portion 86 which has at its upper end a transverse pin 87 extending through the slot 85 to cooperate with the upper end of the spring 84, thus permitting the guide bar and the sleeve 86 to compress the spring 84. A nut 88 is adjustable on screw threads 89 formed on the upper portion of the part 83, this nut serving to limit the upward movement of the guide bar 51.

Figure 12:
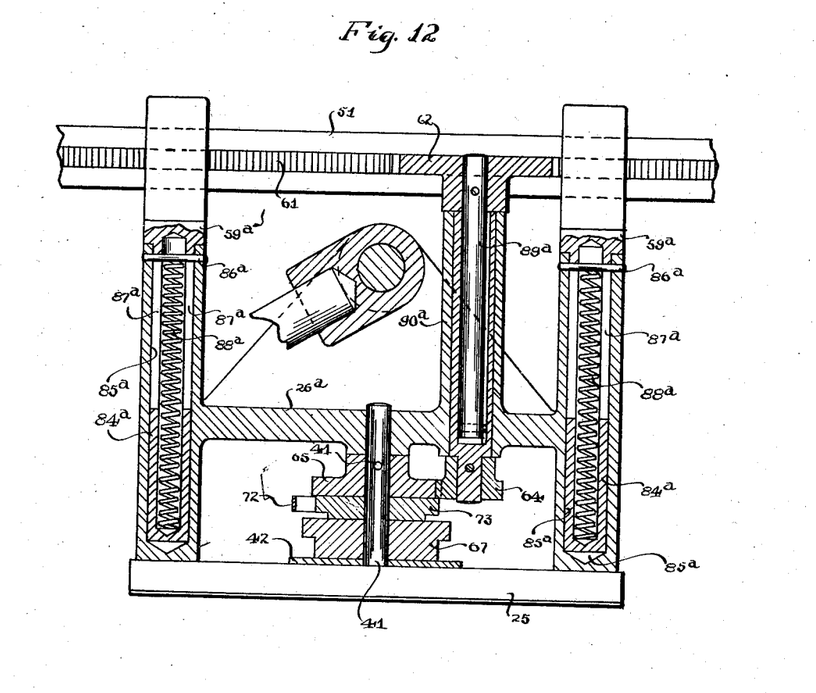
Fig. 12 is a sectional view showing another embodiment of the invention.

The embodiment shown in Fig. 12 is used with a construction in which the supporting posts for the guide bar 51 are solid and the yielding or resilient means is provided between the carriage $26^a$ and the guide 59. With this in view, the guide portions $59^a$ have hollow depending extensions 84ª guided in upwardly opening pockets 85 formed in the carriage 26ª. Pins 86ª extend across the tops of these pockets and through slots 87ª in the extensions 84ª to cooperate with the upper ends of helical springs 88ª seated against the bottoms of the pockets in the extensions 84ª. The gear 62ª has its shaft 89ª telescoping in a hollow portion of a shaft 90ª to which the gear 64 is pinned, so that as the carriage 26ª is depressed against the action of the springs 88ª, the gear 62 will maintain its engagement with the rack 51.

The operation of the invention will be understood from the foregoing but it may be summarized as follows: A book to be indexed is placed on the table or bed 1 and is clamped thereon as hereinbefore described so that the free edges of the leaves form an acute angle with the bed. The guide bar 51 is then adjusted through the slot 82 so that it lies at an acute angle to the edges of the leaves. The carriage is then positioned on the guide bar so that the printing point of the printing mechanism lies near the top edge of the book, the letter "A" being positioned at printing point, and the platen 25 being positioned so that it rests on the leaf to be printed. The leaves above the leaf to be printed rest on the top of the platen. The depression of the lever 35 causes the notcher 27 to notch the leaves and also to depress the character 37 at the printing point into engagement with the leaf. The elevation of the lever 35 shifts the next character of the alphabet to printing point and also advances the carriage 26 one step on the guide bar 51. The carriage is now swung outwardly away from the edges of the leaves to permit the leaves above the next leaf to be printed to be moved out of the way, after which the carriage is swung inwardly and depressed to cause the platen to engage with such next leaf, the leaves to be notched being swung to a position above the platen. These operations are continued until the book is completely indexed and notched.

What I claim as my invention and desire to secure by Letters Patent is:

1. A book index notcher and printer comprising a movable notcher, and a printing mechanism having a printing point beyond the range of movement of the notcher but in line with such line of movement.

2. A book index notcher and printer comprising a movable notcher, a printing mechanism having its printing point in line with the line of movement of the notcher, and a cutting platen arranged between the notcher and that portion of the printing mechanism at the printing point.

3. A book index notcher and printer comprising a reciprocable notcher, a printing member movable to present any character thereon in line with the line of movement of the notcher, and a cutting platen arranged between the notcher and the printing member.

4. A book index notcher and printer comprising a reciprocable notcher, a printing member movable to present any character thereon in line with the line of movement of the notcher, a cutting platen arranged between the notcher and the printing member, and a common operator for moving the notcher toward the platen and for effecting the printing operation on the opposite side of the platen to said notcher.

5. A book index notcher and printer comprising a reciprocable notcher, a platen with one side of which the notcher cooperates, a printing disk mounted to turn on the opposite side of the platen to present any character thereon in line with the line of movement of the notcher, said disk being flexible, and operating means for the notcher having connection with the flexible disk to flex the latter adjacent the character in line with the notcher to cause such character to print with the operation of the notcher.

6. The combination with a work support and a movable notcher, of a printing mechanism having its printing point in line with the line of movement of the notcher, and mechanism for simultaneously effecting a relative movement between the work support and the notcher to cause the notcher to operate at another point on the book and for moving the printing mechanism to shift another character to the printing point.

7. In a book index notcher, the combination with a book support, a notcher, and supporting means for the notcher on which the notcher is movable, of means permitting a relative movement between the notcher supporting means and the book support in a direction parallel with a book on the support, and means permitting the supporting means for the notcher to move toward and from the book support transversely of the first line of movement.

8. In a book index notcher, the combination with a book support, of a guide extending longitudinally of the book support, a notcher, means supporting the notcher for movement on said guide longitudinally thereof, and means permitting said notcher supporting means to move transversely of the length of said guide toward and from the book support.

9. The combination with a work support, of a guide extending longitudinally of the work support, means of supporting said guide for a rocking movement about an axis extending longitudinally of the guide, and a notcher supported from the guide to move thereon in the direction of the length of the guide and to swing with the guide to swing with the notcher toward and from the work on the work support.

10. The combination with a work support, of a guide extending longitudinally of the work support, a carriage movable on the guide, a cutting platen supported by the carriage, and a notcher movable on the carriage toward and from the cutting platen and means permitting the adjustment of the notcher and the platen toward and from the work support.

11. The combination with a work support, of a carriage, a cutting platen supported by the carriage, a notcher movable on the carriage toward and from the platen, means for supporting the carriage for movement over the work support to cooperate with the work on the work support, and means permitting the carriage to move toward and from the work support on a line transverse of the first mentioned line of movement.

12. The combination with a work support, and a carriage, of means providing for relative movement between the carriage and the work support on a line parallel with the work support, a notcher carried by the carriage, and a resilient means holding the carriage away from the work support and permitting it to be moved toward the work support.

13. The combination with a work support, and a guide supported in parallel relation to the work support, of a carriage movable on the guide, a notcher carried by the carriage and movable thereon, mechanism for moving said notcher, a rack bar supported in fixed relation to the guide, a gear on the carriage meshing with said rack bar, and means for turning said gear to advance the carriage along the guide, said means being connected to the mechanism for operating the notcher.

14. The combination with a work support, of a guide extending in parallel relation to the work support and mounted to turn about an axis extending longitudinally of the work support, a carriage movable on the guide, a cutting platen carried by the carriage, a notcher mounted on the carriage and movable toward and from the cutting platen, and a printing member mounted on the carriage and having a printing point in line with the line of movement of the notcher and arranged on that side of the cutting platen opposite the side on which the notcher is arranged.

15. The combination with a work support, of a guide extending in parallel relation to the work support and mounted to turn about an axis extending longitudinally of the work support, a carriage movable on the guide, a cutting platen carried by the carriage, a notcher mounted on the carriage and movable toward and from the cutting platen, a printing member mounted on the carriage and having a printing point in line with the line of movement of the notcher and arranged on that side of the cutting platen opposite the side on which the notcher is arranged, and yielding means holding the carriage away from the work support and permitting said carriage to be moved toward the work support.

16. The combination with a work support, of a guide bar extending parallel with the work support, a rack in fixed relation to the guide bar, a carriage supported for movement on the guide bar, a gear on the carriage meshing with the rack, a notcher movable on the carriage, a shaft carried by said carriage, a cam on the shaft to cooperate with the notcher to move the latter in one direction, a toothed wheel connected with the gear, a slide movable on the carriage, a pawl carried by the slide and cooperating with the toothed wheel, and an eccentric on the shaft cooperating with the slide to move the latter in opposite directions in order to advance the carriage along the guide as the shaft is turned to operate the notcher.

17. The combination with a work support, of posts projecting upwardly from the work support, a guide extending parallel with the work support and adjustable on said posts toward and from the work support, a carriage movable longitudinally of the guide, and a notcher carried by the carriage and movable thereon.

18. The combination with a work support, of a guide arranged parallel with the work support, a carriage movable on said guide, a printing member movable on the carriage, and means for moving the carriage along the guide step by step having connection with the printing member to move the latter to present another character to the printing point with each step movement of the printing member.

19. The combination with a work support, of a carriage movable over the work support, a printing member movable on the carriage, and means moving the carriage step by step over the work support, said means having connection with the printing member to move another character thereon to printing point with each step movement of the carriage.

20. The combination with a work support, of a carriage movable over the work support, a printing member movable on the carriage, means for moving the carriage step by step over the work support, said means having connection with the printing member to move another character thereon to a printing point with each step movement of the carriage, and means permitting the carriage to move relatively to the work support in a line extending transversely of the first mentioned line of movement of the carriage.

21. A book index notcher and printer comprising a reciprocable notcher, and a printing disk mounted to turn about an axis substantially parallel with the line of movement of the notcher to present any character therein in line with the line of movement of the notcher.

22. The combination with a work support, of a guide extending longitudinally of the work support, a carriage movable on the guide, a cutting platen supported by the carriage, and a notcher movable on the carriage toward and from the cutting platen, and means permitting the adjustment of the guide transversely of the work support.

HAROLD H. COTTON.